United States Patent [19]
Larsson et al.

[11] Patent Number: 5,596,607
[45] Date of Patent: Jan. 21, 1997

[54] METHOD AND AN ARRANGEMENT OF ESTIMATING TRANSMITTED SYMBOLS AT A RECEIVER IN DIGITAL SIGNAL TRANSMISSION

[75] Inventors: Lars G. Larsson, Stockholm; Perols B. O. Gudmundson, Sollentuna; Karim Jamal, Stockholm, all of Sweden

[73] Assignee: Telefonaktiebolaget LM Ericsson, Stockholm, Sweden

[21] Appl. No.: 79,886

[22] Filed: Jun. 23, 1993

[30] Foreign Application Priority Data

Jun. 23, 1992 [SE] Sweden .................................. 9201924

[51] Int. Cl.⁶ .............................. H04L 27/06; H03D 1/00
[52] U.S. Cl. ............................................ 375/340; 375/355
[58] Field of Search ...................... 375/340, 341, 375/343, 230, 232, 233, 234, 346, 354, 355, 261, 262; 371/43, 46

[56] References Cited

U.S. PATENT DOCUMENTS

| | | |
|---|---|---|
| 5,031,193 | 7/1991 | Atkinson et al. . |
| 5,048,059 | 9/1991 | Dent . |
| 5,091,918 | 2/1992 | Wales . |
| 5,164,961 | 11/1992 | Gudmundson . |
| 5,191,598 | 3/1993 | Bäckström et al. . |
| 5,228,057 | 7/1993 | Larsson . |
| 5,263,053 | 11/1993 | Wan et al. . |
| 5,285,480 | 2/1994 | Chennakeshu et al. . |
| 5,313,495 | 5/1994 | Kim . |

FOREIGN PATENT DOCUMENTS

| | | |
|---|---|---|
| 0425458 | 5/1991 | European Pat. Off. . |
| 0434651 | 6/1991 | European Pat. Off. . |
| 508407A2 | 10/1992 | European Pat. Off. . |
| 544315A2 | 6/1993 | European Pat. Off. . |
| 508407A3 | 7/1993 | European Pat. Off. . |
| 550143A2 | 7/1993 | European Pat. Off. . |

OTHER PUBLICATIONS

G. Forney, Jr., "The Viterbi Algorithm," Proceedings of the IEEE, vol. 61, No. 3, pp. 268–278 (Mar. 1973).

R. Iltis, "A Bayesian Maximum–Likelihood Sequence Estimation Algorithm for A–Priori Unknown Channels and Symbol Timing," Dept. of Electrical and Computer Engineering, University of California, Santa Barbara, pp. 1–26 (Aug. 21, 1990).

(List continued on next page.)

*Primary Examiner*—Stephen Chin
*Assistant Examiner*—Hai H. Phan
*Attorney, Agent, or Firm*—Burns, Doane, Swecker & Mathis, L.L.P.

[57] ABSTRACT

In a digital time-shared transmission system, a receiver receives a signal whose symbol rate is lower than the channel bandwidth of the system. A correlating and sampling circuit receives a baseband signal, samples the signal a number of times with each symbol time, performs channel correlation, generates a channel estimate and samples down the once sampled signal to an observed signal with two values for each symbol time. A channel equalizer executes a fractional viterbi algorithm which utilizes two delta-metric values for each state transition and generates estimated symbols. A channel estimating filter receives a symbol sequence of alternating zero-value symbols and the estimated symbols and generates an estimated signal. The channel estimating filter is adapted with the aid of an error signal and the filter delivers a channel estimate to the channel equalizer. Weighting factors are generated with the aid of the error signal and the two aforementioned delta-metric values are co-weighted to a common delta-metric value with the aid of weighting factors, this common delta-metric value being used to generate the estimated symbols. The use of the weighting factors improves the metric calculation and enables the channel estimating filter and the channel equalizer to be relatively simple. The insertion of the zero-value symbols simplifies the generation of the weighting factors and the adaptation of the channel estimating filter.

26 Claims, 6 Drawing Sheets

OTHER PUBLICATIONS

F. Magee et al., "Adaptive Maximum–Likelihood Sequence Estimation for Digital Signalling in the Presence of Intersymbol Interference," *IEEE Trans. on Information Theory*, pp. 120–124 (Jan. 1973).

K. Okanoue et al., "New MLSE Receiver Free From Sample Timing and Input Level Controls," 43rd IEEE Vehicular Technology Conf., New Jersey, pp. 408–411 (May 18–20, 1993).

S. Qureshi, "Adaptive Equalization," Proceedings of the IEEE, vol. 73, No. 9, pp. 1370–1373 (Sep. 1985).

G. Ungerboeck, "Adaptive Maximum–Likelihood Receiver for Carrier–Modulated Data–Transmission Systems," *IEEE Trans. on Communications*, vol. COM–22, No. 5, pp. 621–636 (May 1974).

Y. Wan et al., "A Fractionally–Spaced Maximum–Likelihood Sequence Estimation Receiver in a Multipath Fading Environment," Proc. ICASSP, pp. IV–689 to IV–692, IEEE (1992).

S. Chennakesu et al., "Differential Detection of $\pi/4$–Shifted–DQPSK for Digital Cellular Radio", *IEEE*, 1991, pp. 186–191.

A. P. Clark et al, "Adaptive Channel Estimator for an HF Radio Link", *IEEE Trans. on Commun.*, vol. 37, No. 9, Sep. 1989, pp. 918–926.

M. V. Eyuboğlu et al, "Reduced-State Sequence Estimation with Set Partitioning and Decision Feedback", *IEEE Trans. on Commun.*, vol. 36, No. 1, Jan. 1988, pp. 13–20.

W. C. Y. Lee, *Mobile Communications Engineering*, McGraw–Hill Book Co., 1982, pp. 291–336.

Q Liu et al., "An Adaptive Maximum–likelihood Sequence Estimation Receiver with Dual Diversity Combining/Selection", *IEEE*, 1992, pp. 245–249.

Q. Liu et al., "A Unified MLSE Detection Technique for TDMA Digital Cellular Radio", *IEEE*, 1993, pp. 265–268.

J. G. Proakis, *Digital Communications*, McGraw–Hill Book Company, 1989, pp. 554–643.

W. H. Sheen et al., "MLSE Equalization and Decoding for Multipath–Fading Channels", *IEEE Trans. on Commun.*, vol. 39, No. 10, Oct. 1991, pp. 1455–1464.

METHOD AND AN ARRANGEMENT OF ESTIMATING TRANSMITTED SYMBOLS AT A RECEIVER IN DIGITAL SIGNAL TRANSMISSION

BACKGROUND

The present invention relates to a method of estimating in a receiver transmitted symbols from a transmitted signal in conjunction with the transmission of digital signals over a channel, wherein said symbol estimation is effected in accordance with a viterbi algorithm which has a number of states, said method comprising the following method steps:

receiving and filtering the transmitted signal to form a baseband signal;

sampling the baseband signal at at least two sampling time points for each symbol;

effecting correlation to determine the estimated impulse response of the channel with the aid of the sampled signal values and one or more known sequences;

determining a symbol sampling time point at one of the sampling time points;

selecting at least two of the sampling time points with each symbol, of which one is the symbol sampling time point, and selecting the sample signal values at these time points;

determining the delta-metric values in accordance with the viterbi algorithm for an indicated transmitted symbol, said determining process being effected for each of the selected sample signal values and for each state transition of the viterbi algorithm; and generating at least preliminarily estimated symbols in accordance with the viterbi algorithm.

The invention also relates to an arrangement for carrying out the method.

One problem which often occurs when transmitting digital radio signals over a channel is that a transmitted signal is subjected to multipath propagation, resulting in time dispersion and noise. For instance, in mobile telephony, the channel transmission properties will change as a result of a mutual change in the positions of transmitter and receiver. These problems have been solved in time-shared, digital radio transmission systems, by giving the signal sequences, which are transmitted in a time slot, a synchronization sequence and a data sequence. The synchronization sequence is known to the receiver and with the aid of this sequence the receiver is able to make an appraisal of the channel transmission properties, a channel estimate. The receiver makes an appraisal of the symbols of the data sequence, which contains the information to be transmitted, with the aid of this channel estimate.

In certain cases, it is not sufficient to make a channel estimate only once with each time slot. In the case of long time slots, in the order of several milliseconds, transmitter and receiver are able to change their mutual positions quite considerably during the course of the time slot. This means that the channel transmission properties may change considerably over the duration of the time slot, such that the appraisal of the transmitted symbols made by the receiver will be deficient and the transmitted information therefore unclear. A radio receiver in which these disturbances are partially avoided is described in an article in IEEE Transactions on Information Theory, January 1973, pages 120–124, F. R. Magee, Jr. and J. G. Proakis: "Adaptive Maximum-Likelihood Sequence Estimation for Digital Signaling in the Presence of Intersymbol Interference". The article describes a channel equalizer comprising a viterbi analyzer which includes an adaptive filter as a channel estimation circuit. Received symbols are compared successively with hypothetical symbols and those hypothetical symbols which coincide closest with the received symbols are selected successively to form an estimated symbol sequence. The parameters of the adaptation filter are adjusted successively to the changed channel with the aid of the selected, decided symbols.

A description of the viterbi algorithm is found in an article by G. David Forney, Jr.: "The Viterbi Algorithm" in Proceedings of the IEEE, Vol. 61, No. 3, March 1973. The article describes in more detail the state of the viterbi algorithm and its state transitions and discloses how these state transitions are chosen so as to obtain the most probable symbol sequence.

Signal transmission between transmitter and receiver may be encumbered with certain deficiencies, despite carrying out sequence estimation and adaptive channel estimation in the aforesaid manner. One reason for these deficiencies is that the signal bandwidth exceeds the symbol rate of the system, which is commonly known as "excess bandwidth" as in the case, for instance, of the North American mobile telephone system ADC. Such systems are also known as "excess bandwidth systems". A solution to these excess bandwidth problems is described in an article by Yongbing Wan, et al, "A Fractionally-Spaced Maximum-Likelihood Sequence Estimation Receiver in a Multipath Fading Environment" Proceedings ICASSP pp. 689–692, published by IEEE 1992. According to this article, a received radio signal is sampled twice with each symbol and the channel estimation is effected through an adaptive filter which utilizes this double sampling rate. The symbol estimation is carried out in a viterbi analyzer which also utilizes the double sampling rate. The delta-metric values, i.e. deviations between the received and the hypothetical sequences, are calculated on both the sampling occasions for each symbol and the two delta-metric values are summed directly in order to determine a best state transition according to the viterbi algorithm. When adapting the filter with the aid of the estimated symbols, a fictive symbol is inserted at each alternate sampling time point. These fictive symbols are generated by interpolation between the estimated symbols in a second filter. The proposed solution has certain drawbacks. It is necessary to sample the received symbols at a time point which has been very well established and the adaptive channel estimation is of high complexity. The interpolation in the second filter results in delays which impair the symbol estimation. The signalling processing filters used, for instance a transmitter filter, or receiver filter must be known. The receiver filters in particular, which may include coils and capacitors, cause problems in this respect as a result of aging, manufacturing accuracy and temperature variations.

Another solution to the problems that occur at the aforesaid relatively low symbol frequency is given in a paper by R. A. Iltis: "A Bayesian Maximum-Likelihood Sequence Estimation Algorithm for A-Priori Unknown Channel and Symbol Timing", Department of Electrical and Computer Engineering, University of California, Santa Barbara, Aug. 21, 1990. This paper also states that sampling of a received signal shall be effected twice for each symbol. The symbol estimation is effected in accordance with a viterbi algorithm, which calculates two delta-metric values for each symbol, and these two values are co-weighted in the metric calculation. The channel estimation is effected in an adaptive filter with filter coefficients at a symbol time spacing, although the coefficients are adapted on each sampling occasion, thus twice with each symbol. The proposed solution further involves a relatively complicated metric calculation, and due to the symbol-spaced channel estimate and fails to solve the problem of symbol synchronization for complicated, rapidly varying channels. As with the aforedescribed solution proposed by Yongbing Wan, a receiver filter for instance must be known with good accuracy by the receiver.

SUMMARY

The present invention relates to a method and to an arrangement for symbol estimation in digital transmission systems. The method readily solves those problems which occur at low sampling rates, or expressed more precisely those problems which occur when the digital transmission system has a symbol frequency which is below the signal bandwidth of the system. A received signal is sampled at least twice for each symbol time, to provide the observed signal values, and the symbol estimation is effected in accordance with a viterbi algorithm. This algorithm utilizes the estimated values of the channel impulse response, which are constant or, in the case of long time slots, are generated adaptively in a channel estimation filter which is updated at each sampling moment. The symbol values estimated in accordance with the viterbi algorithm are utilized for this adaptation of the channel estimation filter. The estimated values of the received signal are formed in the channel estimation filter with the aid of the estimated symbols, and the error signals are formed at each sampling moment as a difference between the estimated signal values and the observed sampled signal values. The coefficients of the channel estimation filter are adapted when applicable with the aid of the error signals in accordance with a selected adaptation algorithm. When selecting the state transitions according to the viterbi algorithm, there is calculated for each state transition a delta-metric value for each symbol sampling moment. Each of the delta-metric values is multiplied by a respective weighting factor and the values are summed to form a total delta-metric value for an observed state transition. The weight factors are generated according to the inverted values of the error signals and the fact that the coefficients in the channel estimation filter are able to contribute to residual interferences to different extents is hereby taken into account in the metric calculation. This residual interference arises because the true channel transmission function is represented by the channel estimate, which always implies an approximation. The greater the number of coefficients possessed by the filter, the better the approximation, although a large number of coefficients will result in a complicated filter and, above all, will mean that the viterbi algorithm must have a large number of states and will therefore become complicated and require a complicated calculating process. The accuracy of the metric calculation is relatively good when the delta-metric values are weighted, which opens up the possibility of including relatively few coefficients in the channel estimation filter.

As before mentioned, the estimated symbols are used when adapting the channel estimation filter. In order to enable this adaptation to be carried out at the sampling time points between the symbols, fictive symbols are inserted in these intermediate time points. The fictive symbols are assigned zero-values, therewith simplifying filter adaptation. In this way, the new filter coefficient values need only be generated once with each symbol, irrespective of the number of sampling time points per symbol. The fictive symbols are also utilized when generating the disturbance level values, even in those instances when the channel estimation filter is constant and not adapted. The insertion of the zero-value fictive symbols results in relatively small time delays when adapting the channel estimation filter and when generating the disturbance level values. This is contributory in enabling the symbols to be estimated with good accuracy.

BRIEF DESCRIPTION OF THE DRAWINGS

An exemplifying embodiment of the invention will now be described in more detail with reference to the accompanying drawings, in which.

DETAILED DESCRIPTION

Figure 1:
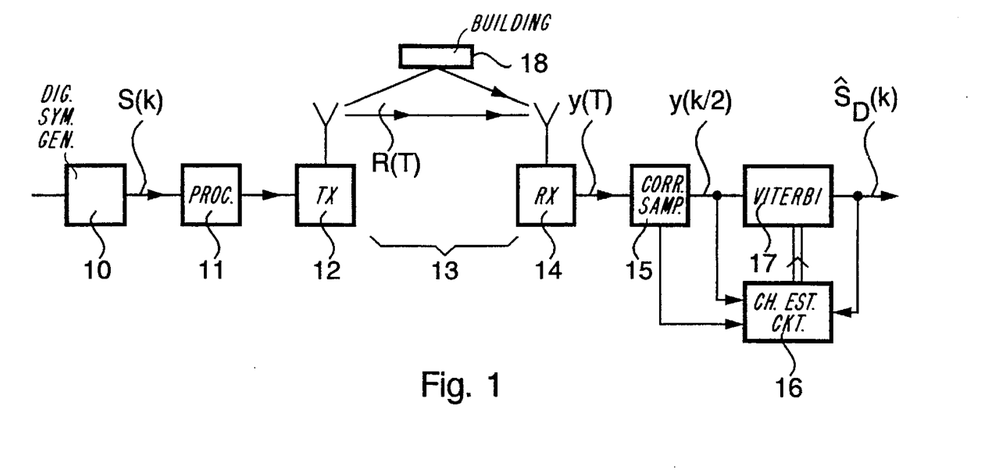
FIG. 1 is a block schematic overall view of a transmitter and a receiver in a digital radio system.

FIG. 1 illustrates a radio transmission system for time-shared, digital signal transmission. A transmitter includes a unit 10 which receives an information carrying signal and generates corresponding digital symbols S(k). The symbols S(k) are signal processed in the unit 11 and transmitted to a radio transmitter 12, which transmits the signal analogized in the unit 11 on a selected carrier frequency as a signal R(T). This signal is transmitted over a radio channel 13 to a receiver having a radio receiver 14. Among other things, the channel 13 subjects the signal R(T) to multipath propagation, as indicated by double signal paths in the Figure. For instance, the signals travelling along a signal path are reflected by a building 18 prior to reaching the receiver. The radio receiver 14 demodulates the received signal to one baseband and delivers a baseband signal y(T) to a correlating and sampling circuit 15. In turn, this circuit delivers an observed sample signal designated y(k/2). The signal y(k/2) is processed in a channel equalizer 17 in accordance with a viterbi algorithm, and the equalizer produces estimated symbols $\hat{S}_D(k)$, which shall coincide as close as possible with the symbols S(k) transmitted by the transmitter. The correlating and sampling circuit 15 is connected to a channel estimating circuit 16 and delivers thereto the initial values of a channel estimate which includes the channel 13. The circuit 16 is adaptive and generates successively the new coefficient values for the channel estimate, this estimate thereby being adapted successively to the time varying channel 13 with the aid of the signal y(k/2) and the estimated symbols $\hat{S}_D(k)$.

Figure 2:
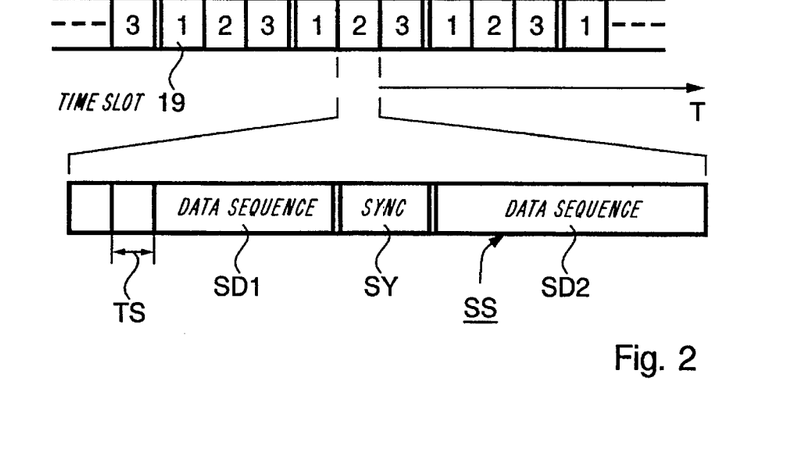
FIG. 2 illustrates time slots and a symbol sequence for time-shared radio transmission.
Figure 3:
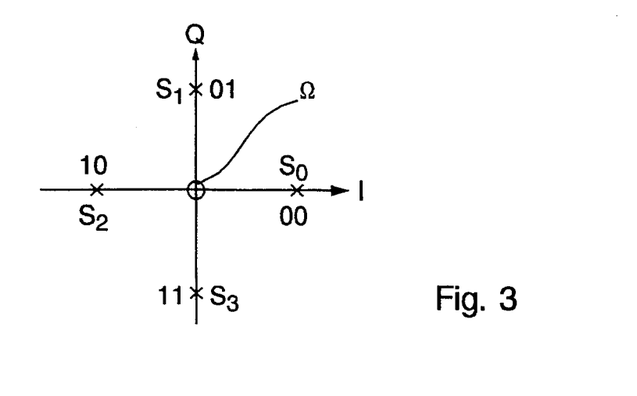
FIG. 3 illustrates a complex plane with symbol values.

As before mentioned, the radio transmission system according to the illustrated embodiment is time-shared, as shown in FIG. 2, in which T represents time. A carrier frequency, or actually a frequency pair for two-way communication, is divided into three time slots 19, numbered 1, 2 and 3. A symbol sequence SS comprising a synchronization sequence SY and two data sequences SD1 and SD2 is transmitted in each time slot, said sequences containing the information to be transmitted. The symbol sequence SS includes binary signals, although the aforesaid symbols S(k) are modulated in accordance with QPSK-modulation for instance, as illustrated in FIG. 3. In a complex plane having coordinate axes referenced I and Q, the four possible values $S_0$, $S_1$, $S_2$ and $S_3$ of the symbols S(k) are marked and corresponding binary digits 00, 01, 10 and 11 are given. The time taken to transmit one such modulated symbol is designated one symbol time TS, as illustrated schematically in FIG. 2. It is these full symbol times TS that are counted by the integer symbol counter k.

The system illustrated in FIGS. 1 and 2 may be comprised of a mobile telephone system in which the transmitter is a base station and the receiver is a mobile station, or vice versa. The three time slots 1, 2 and 3 the signal sequence SS comply with the standard for the American mobile telephone system ADC. In this system, the time slots have a length of 6.7 milliseconds, which requires the channel estimation circuit 16 to be adaptive, as mentioned above.

As mentioned in the introduction, problems arise with channel equalization and symbol estimation in digital radio transmission systems, the symbol frequency R=1/TS of which is lower than the signal bandwidth B of the system. This is the case, for instance, in the aforesaid ADC-system, the signal bandwidth of which is B=30 kHz and the symbol frequency of which is R=24.3 kBd. According to the sampling theorem, it is not sufficient to sample the baseband signal y(T) in such systems at the symbol frequency R. The symbol frequency R can only be used as the sampling frequency when so-called matched filters are used in the receiver, that is to say filters which are matched at any moment to the cascade of all transmitter and receiver filters and to the transmission function of the channel 13. In other cases, it is necessary to use a higher sampling frequency, particularly when wishing to use a simple channel estimation filter, which causes problems with channel estimation and channel equalization processes. It is these problems that are solved by means of the present invention for a channel equalizer which functions in accordance with the viterbi algorithm. Those problems associated with effecting channel estimation in an adaptive filter are also solved in a simple manner.

Figure 4:
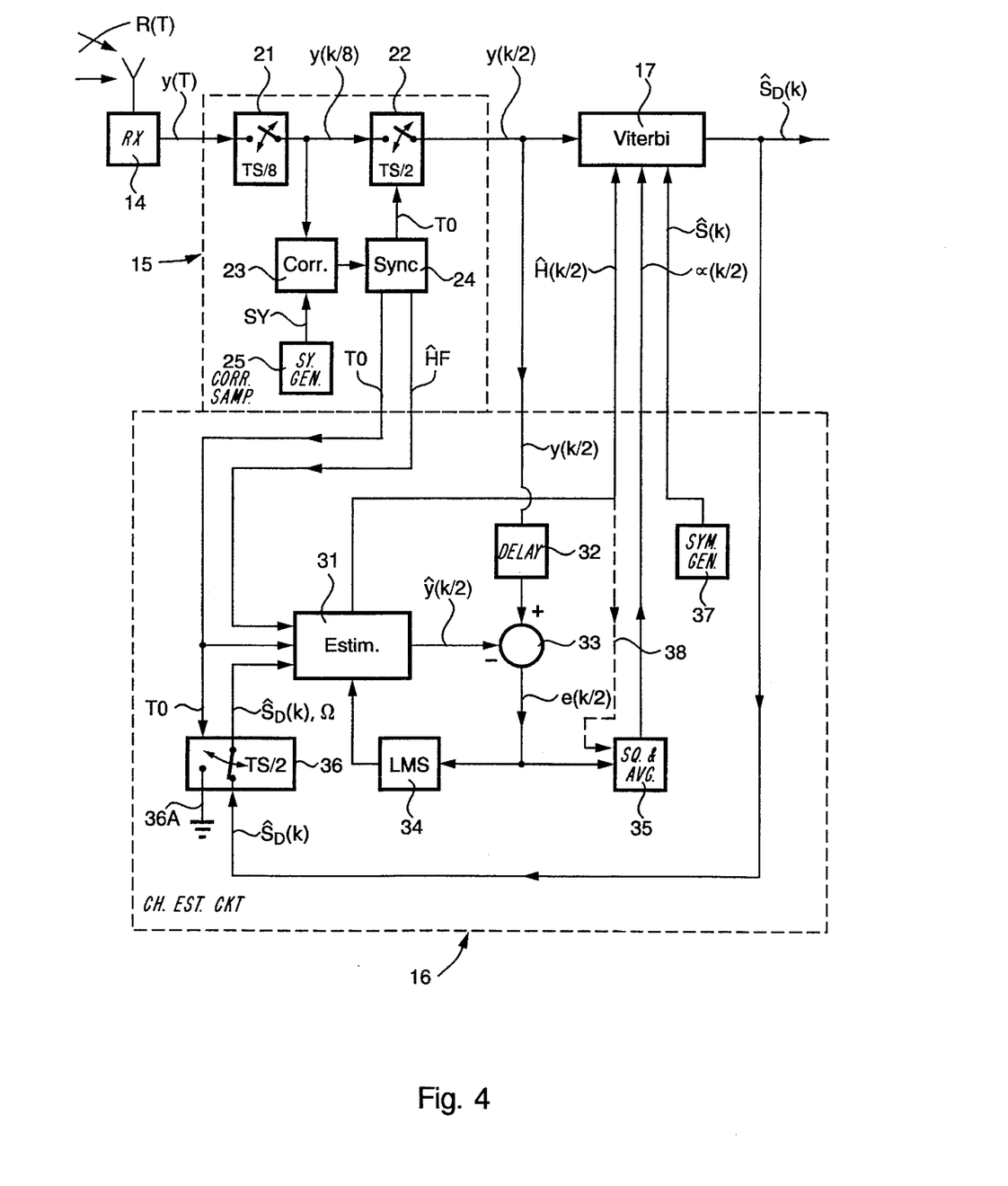
FIG. 4 is a block schematic illustrating the receiver.

The receiver illustrated schematically in the right half of FIG. 1 is shown in more detail in FIG. 4. The radio receiver 14 is connected to the correlating and sampling unit 15, which includes a first sampling unit 21, a second sampling unit 22, a correlating circuit 23, a synchronization circuit 24 and a generator 25 for generating the synchronizing sequence SY known by the receiver. The first sampling unit 21 receives the continuous baseband signal y(T) from the radio receiver 14 and samples this signal eight times for each symbol, i.e. with the sampling frequency of 8/TS. This sampling frequency is used in the aforesaid mobile telephone system ADC. The thus sampled signal, designated y(k/8), is delivered to the correlating circuit 23. There is generated in this circuit by least squares estimation e.g. correlation, a first channel estimate ĤF for the observed symbol sequence SS with the aid of the synchronization sequence SY from the generator 25 and the transmitted, observed synchronization sequence. When generating this first channel estimate, a symbol sampling time point TO is also established in the synchronizing circuit 24. This symbol sampling time point controls the second sampling unit 22 through which, according to the illustrated embodiment, two of the original eight sampling time points of each symbol are selected with a time spacing of TS/2. The observed signal y(k/2) is obtained in this way and is delivered by the sampling unit to the viterbi analyzer 17. Down-sampling is effected in the unit 22 in order to simplify signal processing in this analyzer. The original eight samples are used to establish the symbol sampling time point TO, which is a starting point for symbol counting with the aforesaid counter k. The symbol sampling time point and the channel estimate ĤF are sent to the channel estimating circuit 16.

The manner in which the channel estimate ĤF is generated in the correlating and sampling circuit 15 will now be described in brief. An impulse response which includes the transmission function of the channel 13 is generated with the aid of the signal y(k/8) and the synchronizing sequence SY. The impulse response extends over a time period which includes several symbol times TS, and the discrete values of the impulse response are generated at the time spacing TS/8. There is selected within this time period a second, shorter time period which contains the first channel estimate ĤF. The choice is made so that the first channel estimate ĤF will obtain maximum energy. Furthermore, the first channel estimate ĤF is produced only at time points which are mutually spaced by the time spacing TS/2. The manner in which the channel estimate is chosen is described, for example in the Swedish Patent Application No. 8903842-6. It should be noted that the channel estimate, both the first channel estimate ĤF and the later, adapted channel estimate, includes both the physical radio channel 13 and the transmitter filter 11 and receiver filter, for instance MF-filter, used to separate the carrier frequency. It should also be noted that the terms "correlator" and "correlation" are used here in a broad sense, thereby including general least-squares (LS) estimation, of which "correlation" is a special case.

The channel estimating circuit 16 includes an adaptive channel estimating filter 31, a delay circuit 32, a difference former 33, a circuit 34 which executes an adaptation algorithm, a quadrating and average value forming circuit 35, a signal switch 36 and a symbol generator 37. The channel estimating filter 31 receives the first transmission function ĤF and the symbol sampling time point TO, and also receives the symbols $Ŝ_D(k)$ estimated in the channel equalizer 17. With the aid hereof, estimated signal values ŷ(k/2) are formed and delivered to the difference former 33. This circuit also receives the observed signal y(k/2), which is delayed in the circuit 32, and delivers an error signal e(k/2)=y(k/2)−ŷ(k/2). The error signal is delivered to the circuit 34, which controls the adaptive filter 31 through its adaptation algorithm. In turn, this filter delivers to the equalizer 17 successively adapted values Ĥ(k/2) for the channel estimate. The equalizer also receives weighting factors α(k/2), which are generated in the circuit 35 with the aid of the error signal e(½), as will be described in more detail herebelow. The channel equalizer 17 receives from the symbol generator 37 hypothetical symbols Ŝ(k), which take the four symbol values $S_0$, $S_1$, $S_2$ and $S_3$ shown in FIG. 3. The signal switch 36 is controlled from the synchronizing circuit 24 and shifts at an interval of one-half symbol time, TS/2, alternating between an estimated symbol $Ŝ_D(k)$ and a fictive symbol Ω, which has zero-value. This zero-value shall not be confused with the binary value 00 for the complex value symbol $S_0$ in FIG. 3. The fictive zero-value symbol Ω lies on the origin in the complex plane I-Q, as shown in FIG. 3. The generation of the fictive symbols Ω have been illustrated schematically in the Figure, by connecting one terminal 36A of the signal switch 26 to ground potential. The reason why the zero-values are switched-in will be explained in more detail below with reference to FIG. 5.

Figure 5:
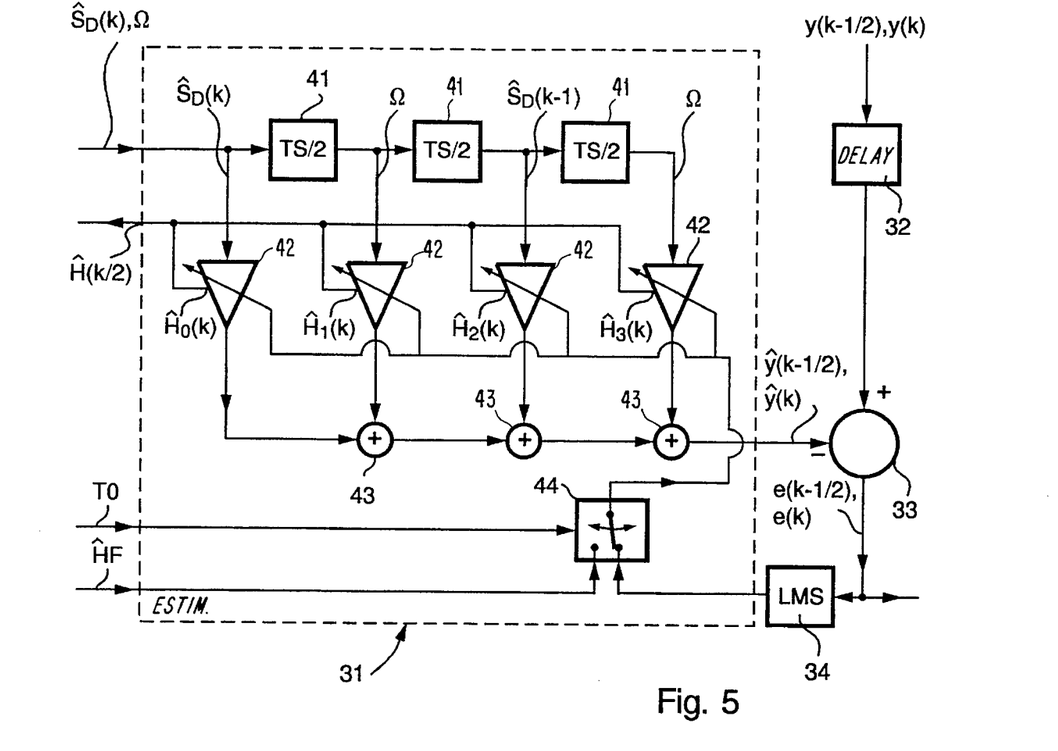
FIG. 5 is a block schematic illustrating a channel estimation filter.

This Figure shows the channel estimating filter 31, the delay circuit 32, the difference former 33 and the circuit 34 with the adaptation algorithm. The filter 31 has delay circuits 41, coefficient circuits 42, summators 43 and a switch 44. The delay circuits 41 are connected sequentially in series and function to delay the incoming signal successively through one-half symbol time TS/2. The subsequent delayed signals are multiplied in the coefficient circuits 42 with coefficients $\hat{H}_0(k)$, $\hat{H}_1(k)$, $\hat{H}_2(k)$ and $\hat{H}_3(k)$ respectively, which are the values of the channel estimate $\hat{H}(k/2)$ at four time points with a mutual spacing of one-half symbol time TS/2. The output signals from the coefficient circuits 42 are summed in the summators 43 to the estimated signal values $\hat{y}(k/2)$. The error signals $e(k/2)$ are formed in the difference former 33 and delivered to the adaptation algorithm in the circuit 34. This algorithm is chosen in dependence on those disturbances which the radio channel 13 is assumed to have, and in the illustrated embodiment is a so-called LMS-algorithm (Least Mean Square). The output signal from the circuit 34 adjusts the coefficients in the coefficient circuits 42, so that the effect of the error signals $e(k/2)$ will be minimized in accordance with the LMS-algorithm. The coefficient circuits obtain their starting values through the first channel estimate $\hat{H}F$ from the correlating and sampling circuit 15. These starting values are applied with the aid of the switch 44, which is controlled by the signal TO from the synchronization circuit 24. The estimated signal values $\hat{y}(k/2)$ are generated with the aid of the estimated symbols $\hat{S}_D(k)$, which are delayed by the viterbi algorithm through a number q symbol times TS. The observed signal values $y(k/2)$ are therefore delayed by the number q symbol times in the delay circuit 32. It should be noted that, for example, the estimated symbols $\hat{S}_D(k)$ may be delayed with respect to the received signal due to the decision delay of the viterbi algorithm, although the same symbol index counter, k, is used in the equations given here. This is done only for simplicity, and those of ordinary skill in the art will recognize that some circuits cause delays that must be appropriately compensated. In this application it has been deemed necessary to indicate a delay explicitly only in a few instances. By inserting the zero-value fictive symbols $\Omega$ between the estimated symbols $\hat{S}_D(k)$, the coefficient circuits 42 obtain a zero-value input signal with each alternate update. Consequently, these coefficient circuits need only be updated once for each symbol time TS, which simplifies the updating process. This will become more evident from the following description of the channel estimating method.

The estimated signal $\hat{y}(k/2)$ has two separate values for each symbol, i.e. the value $\hat{y}(k)$ at the symbol sampling time point TO and the value $\hat{y}(k-\frac{1}{2})$ one half symbol time TS/2 earlier on. These values are generated as follows:

$$\hat{y}(k-\frac{1}{2})=\hat{H}_0(k)\,\hat{S}_D(k)+\hat{H}_2(k)\,\hat{S}_D(k-1)$$

$$\hat{y}(k)=\hat{H}_1(k)\,\hat{S}_D(k)+\hat{H}_3(k)\,\hat{S}_D(k-1) \quad (1)$$

It may be said that the estimated impulse response values $\hat{H}_0(k)$ and $\hat{H}_2(k)$ form one symbol-sampled subset of the estimated impulse response and the values $\hat{H}_1(k)$ and $\hat{H}_3(k)$ form another symbol-sampled subset. In general, the number of subsets corresponds to the number of samples per symbol produced by the sampling unit 22 and the number of members in each of the subsets is a function of the number of states used in the viterbi algorithm.

In FIG. 5, the symbol values of the symbol sequence $\hat{S}_D(k)$, $\Omega$ at time position $k-\frac{1}{2}$ one-half symbol time TS/2 prior to the symbol sampling time point TO are marked at the inputs of the coefficient circuits 42. The symbol values are shifted TS/2 to the right in the Figure at symbol sampling time point TO through one-half symbol time. During a symbol time, the error signals $e(k/2)$ have two separate values during the symbol time TS:

$$e(k-\frac{1}{2})=y(k-\frac{1}{2})-\hat{y}(k-\frac{1}{2})$$

$$e(k)=y(k)-\hat{y}(k) \quad (2)$$

where $y(k)$ and $y(k-\frac{1}{2})$ are the two signal values observed during a symbol time of the observed signal $y(k/2)$. In the case of the illustrated embodiment, the channel estimate is updated by the LMS-algorithm in accordance with the following relationships:

$$\begin{bmatrix} \hat{H}_0(k) \\ \hat{H}_1(k) \\ \hat{H}_2(k) \\ \hat{H}_3(k) \end{bmatrix} = \begin{bmatrix} \hat{H}_0(k-1) \\ \hat{H}_1(k-1) \\ \hat{H}_2(k-1) \\ \hat{H}_3(k-1) \end{bmatrix} + \mu \begin{bmatrix} \hat{S}_D(k) \\ 0 \\ \hat{S}_D(k-1) \\ 0 \end{bmatrix} e(k)$$

$$\begin{bmatrix} \hat{H}_0(k) \\ \hat{H}_1(k) \\ \hat{H}_2(k) \\ \hat{H}_3(k) \end{bmatrix} = \begin{bmatrix} \hat{H}_0(k-1) \\ \hat{H}_1(k-1) \\ \hat{H}_2(k-1) \\ \hat{H}_3(k-1) \end{bmatrix} + \mu \begin{bmatrix} 0 \\ \hat{S}_D(k) \\ 0 \\ \hat{S}_D(k-1) \end{bmatrix} e(k-1/2) \quad (3)$$

where $\mu$ is a parameter, the step length, in the adaptation algorithm. It will be seen from the equations (3) that the values of the coefficient circuits 42 need only be calculated once for each symbol time, as a result of the insertion of the zero-value fictive symbols $\Omega$. It will also be seen from the equations (1) that the insertion of the zero-value symbol $\Omega$ also simplifies generation of the estimated signals $\hat{y}(k/2)$. Each of the relationships (1) has only two terms instead of the four terms which would be required if values other than zero-values were inserted between the estimated symbols $\hat{S}_D(k)$ and $\hat{S}_D(k-1)$.

Figure 6:
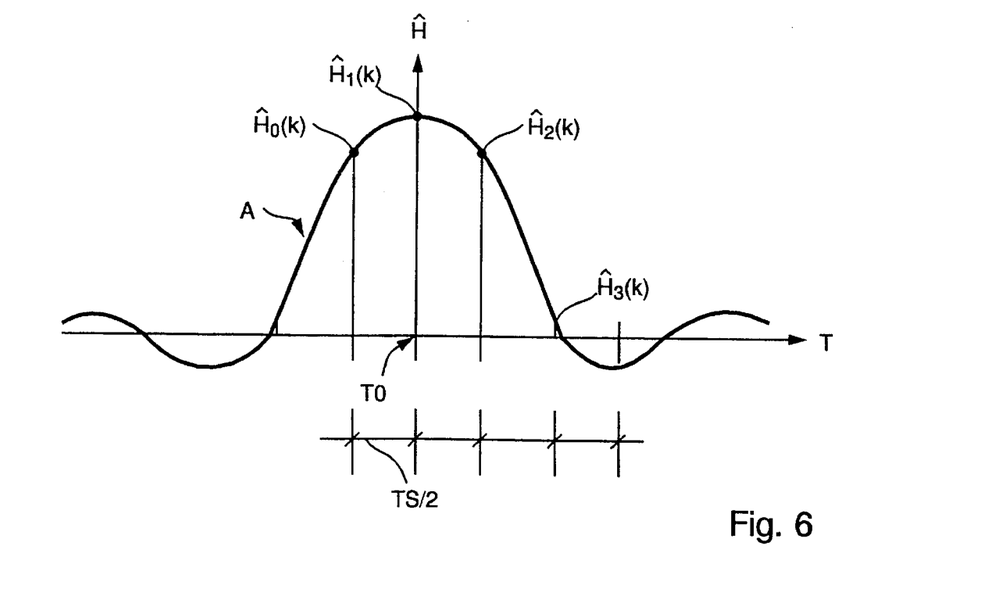
FIG. 6 is a diagrammatic illustration of a radio channel impulse response.

An example of the channel estimate appearance is shown in FIG. 6, which is a diagram in which the coordinate axes are referenced T and $\hat{H}$. A curve A shows a continuous channel impulse response and the chosen time points on the time spacing TS/2 denote the discrete values $\hat{H}_0(k)$, $\hat{H}_1(k)$, $\hat{H}_2(k)$ and $\hat{H}_3(k)$ of the channel estimate. The aforesaid symbol sampling time point TO is given in the Figure and the symbol counter k denotes that the discrete channel estimate values relate to the transmitted symbol with number k.

Figure 7:
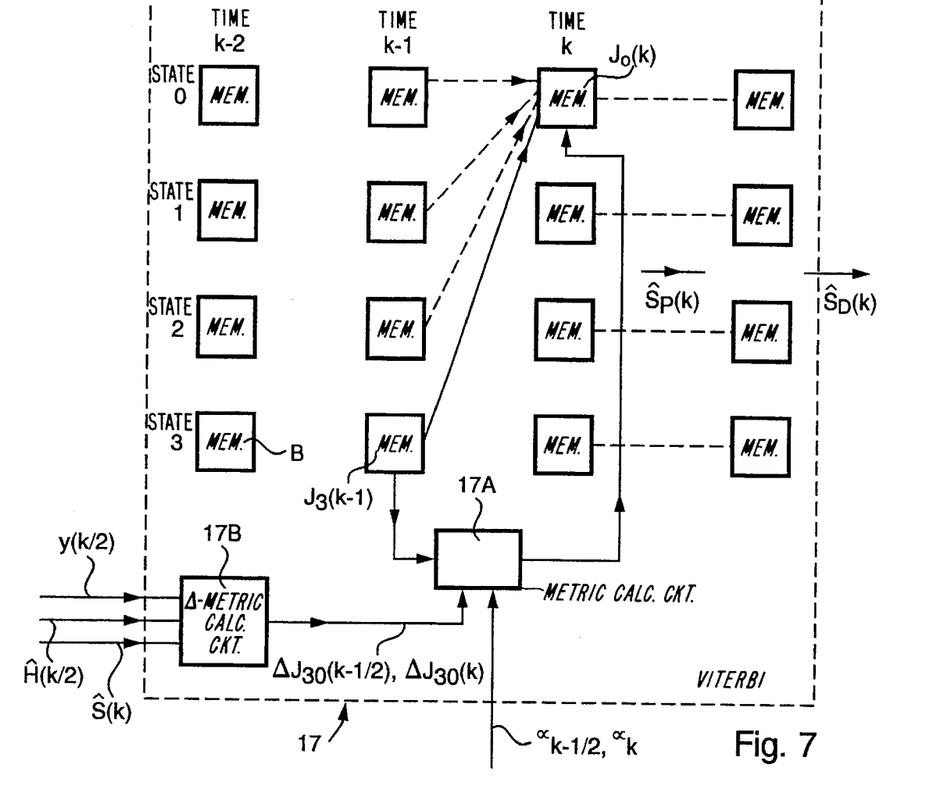
FIG. 7 illustrates certain states and state transitions in a viterbi algorithm.

The channel equalizer 17 functions in accordance with a so-called fractional viterbi algorithm, since it channel equalizes the signal $y(k/2)$ which is sampled in fractions of the symbol time TS. The reader is referred to the aforesaid reference "The Viterbi Algorithm" by G. Forney for a more detailed description of the viterbi algorithm. The algorithm has a number of states $N=M^{L-1}$ in a known manner, where M signifies the number of values that a symbol can have, and L is the length of the channel estimate in number of symbol times TS. In the case of the illustrated embodiment, $M=4$ according to FIG. 3 and $L=2$ according to FIG. 5, so that the equalizer 17 will have $N=4$ number of states. These states are illustrated in FIG. 7 and are there referenced B and numbered 0, 1, 2 and 3. The algorithm is illustrated by node plans in columns, of which some are shown in the Figure. The node plan relates to separate time points referenced $k-2$, $k-1$ and $k$, where the letter $k$ represents the aforesaid symbol counter. The viterbi algorithm compares, in a known manner, sequences of the observed signals $y(k/2)$ with hypothetical sequences that are generated with the aid of the hypothetical symbols $\hat{S}(k)$ and with the aid of the channel estimate $\hat{H}(k/2)$. The hypothetical symbols are given by the equation:

$$\hat{S}(k)=(\hat{S}_0(k), \hat{S}_1(k), \hat{S}_2(k), \hat{S}_3(k)) \quad (4)$$

Deviations between the two sequences are referred to as metric values $J_j(k)$ which are calculated successively by addition of the delta-metric values. These delta-metric values are calculated for transitions between the states B, as illustrated in FIG. 7 with a full line arrow for the transition from the state 3 having the metric value $J_3(k-1)$ to the state 0 having the metric value $J_0(k)$. In the illustrated embodiment, the channel equalizer receives the observed signal values $y(k/2)$ which have these two values with each symbol time $y(k)$ and $y(k-½)$. The two delta-metric values are generated for each state transition in accordance with the following general equation for the transition i to j with the aid of these values and with the aid of the channel estimate $\hat{H}(k/2)$ and the hypothetical symbols $\hat{S}(k)$:

$$\Delta J_{ij}(k)=|y(k)-(\hat{H}_1(k)\,\hat{S}_j(k)+\hat{H}_3(k)\,\hat{S}_i(k-1))|^2$$
$$\Delta J_{ij}(k-½)=|y(k-½)-(\hat{H}_0(k)\hat{S}_j(k)+\hat{H}_2(k)\,\hat{S}_i(k-1)|^2 \quad (5)$$

These delta-metric values are generated in full accord with the viterbi algorithm and with known devices schematically illustrated with a circuit 17B in FIG. 7. This circuit receives the observed signal $y(k/2)$, the hypothetical symbols $\hat{S}(k)$ and the channel estimate $\hat{H}(k/2)$. The states B are realized with the aid of memory circuits which store the metric values.

That part of the inventive symbol estimating process which relates to the viterbi algorithm is concerned with the continued processing of these delta-metric values. When generating a total, summed delta-metric value for the state transition i to j, the two delta-metric values are jointly weighted with the aid of weighting factors $\alpha(k/2)=(\alpha_k,\alpha_{k-½})$. The generation of these weighting factors will be explained in more detail below. The metric value $J_j(k)$ in the new state j is generated in accordance with the general equation:

$$J_j(k)=J_i(k-1)+[\alpha_k\Delta J_{ij}(k)+\alpha_{k-½}\Delta J_{ij}(k-½)] \quad (6)$$

in which the expression contained within the square brackets is the total summed delta-metric value.

The metric values are generated in a metric calculating circuit 17A in FIG. 7 and are there illustrated for the state transitions 3 to 0. The metric calculating circuit 17A receives the delta-metric values $\Delta J_{30}(k-½)$ and $\Delta J_{30}(k)$ from the circuit 17B and the weighting factors $\alpha_{k-½}$ and $\alpha_k$ from the circuit 35 and generates the total summed delta-metric value for the transition 3 to 0. Also generated in the circuit 17A are the total delta-metric values for the remaining transitions from the state 0, 1 and 2 to the state 0, as shown by the broken arrows in the Figure. According to the viterbi algorithm, there is chosen the state transition which has the lowest of these total delta-metric values, which in the illustrated embodiment is assumed to be the transition 3 to 0. The new metric value $J_0(k)$ for the selected state transition is then generated in accordance with the above equation (6).

The new metric values are generated successively until the last node plane of the algorithm and the estimated symbols $\hat{S}_D(k)$ are decided on the basis of the metric values thus obtained, in accordance with the viterbi algorithm. Preliminarily estimated symbols $\hat{S}_P(k)$ can be decided at an earlier stage, for instance after the node plane referenced k in FIG. 7. According to one alternative, these preliminarily estimated symbols $\hat{S}_P(k)$ can be used in the symbol sequence instead of the estimated symbols $\hat{S}_D(k)$. The preliminarily estimated symbols are used in this way to update the channel estimation filter 31 according to the equation (3) and also for producing the error signals $e(k-½)$ and $e(k)$ in accordance with the equations (1) and (2).

The aforesaid weighting factors $\alpha_{k-½}$ and $\alpha_k$ are generated with the aid of the error signals $e(k)$ and $e(k-½)$. The generation of these weighting factors is based on the observation that the statistical expectation values of the absolute value of respective error signals represent a combined interference caused by noise, intersymbolic interference and co-channel interference. The greater the expectation value, the less the estimated signal values $y(k-½)$ and $\hat{y}(k)$ will correspond to their respective observed signals $y(k-½)$ and $y(k)$. The weighting factors shall be correspondingly smaller, so that the delta-metric value, $\Delta J_{ij}(k-½)$ or $\Delta J_{ij}(k)$, associated with a large error signal will give a correspondingly smaller contribution when generating the new metric value $J_j(k)$. The powers of the two error signals $e(k)$ and $e(k-½)$ can differ considerably from one another, particularly when the channel estimate $\hat{H}(k/2)$ has only a few coefficients.

Figure 8:
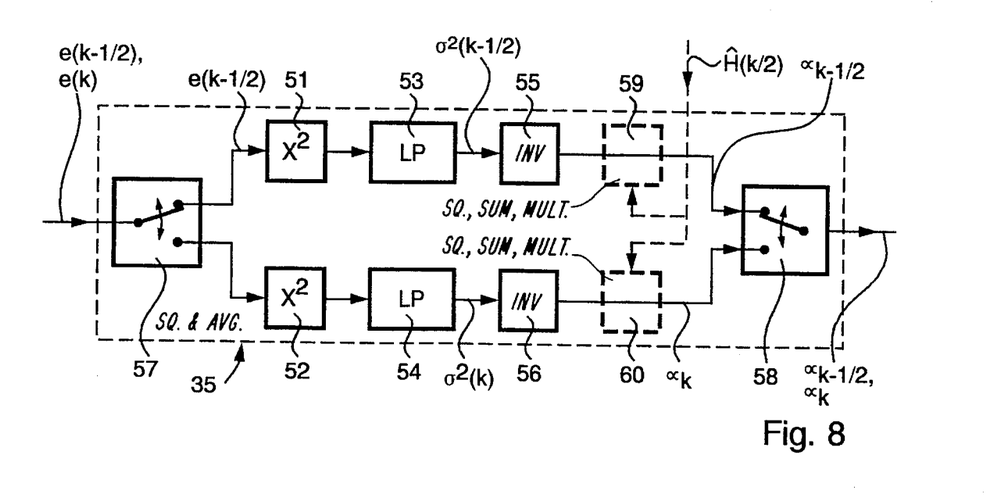
FIG. 8 is a block schematic illustrating a weighting factor generating circuit.

The statistical expectation values are estimated by squaring (or quadrating) the value of the error signals and forming average values. The expectation values and the weighting factors are generated in the circuit 35, which is shown in more detail in FIG. 8. The circuit has two quadrators 51 and 52, two lowpass filters 53 and 54, two inverters 55 and 56 and two signal switches 57 and 58. The signal switch 57 receives the error signals $e(k/2)$ and delivers these signals alternately to the quadrators 51 and 52 at intervals of one-half symbol time TS/2. The signal switch 57 is controlled by signals from the synchronizing circuit 24 in FIG. 4 in a manner not more closely shown. The two error signals $e(k-½)$ and $e(k)$ are squared in their respective quadrators 51 and 52 and the squared values are formed into average values by filtering said squared values through respective lowpass filters 53 and 54. These filters deliver signals $\sigma^2(k-½)$ and $\sigma^2(k)$ which correspond to the aforesaid statistical expectation values of the error signals. The signals $\sigma^2(k-½)$ and $\sigma^2(k)$ are inverted in respective inverters 55 and 56 to produce the aforesaid weighting factors $\alpha_k$ and $\alpha_{k-½}$ and are delivered to the signal switch 58 This switch is controlled from the synchronizing circuit 24 in a manner not shown in detail, and applies the weighting factors to the metric calculating circuit 17A in the channel equalizer 17 at intervals of one-half symbol time TS/2. The circuit 35 in FIG. 4 thus generates the weighting factors in accordance with the following equation.

$$\alpha_{k-\frac{1}{2}} = 1/\overline{|e(k-1/2)|^2} \quad (7)$$

$$\alpha_k = 1/\overline{|e(k)|^2}$$

where the line above $e(k-\frac{1}{2})$ and $e(k)$ denotes the formation of mean values.

According to one alternative, attention is also paid to the size of the filter coefficients when generating the weighting factors in accordance with the following equations:

$$\alpha_{k-\frac{1}{2}} = (\hat{H}_0^2 + \hat{H}_2^2)/\sigma^2(k-\frac{1}{2})$$

$$\alpha_k = (\hat{H}_1^2 + \hat{H}_3^2)/\sigma^2(k) \quad (8)$$

In order to generate these alternative weighting factors, the circuit 35 receives the channel estimate $\hat{H}(k/2)$ from the channel estimation circuit 31 via a connection 38 shown by a broken line in FIG. 4. The filter coefficients $\hat{H}_0$ and $\hat{H}_2$ and respectively $\hat{H}_1$ and $\hat{H}_3$ are squared and summed in pairs in circuits 59 and 60 included in the quadrating and mean-value-forming circuit 35, and multiplied with the inverted values of a $\sigma^2(k-\frac{1}{2})$ and $\sigma^2(k)$ respectively. The thus generated weighting factors $\alpha(k/2)$ are delivered to the channel equalizer 17 and used in the metric calculation as described above with reference to equations (5) and (6).

Figure 9:
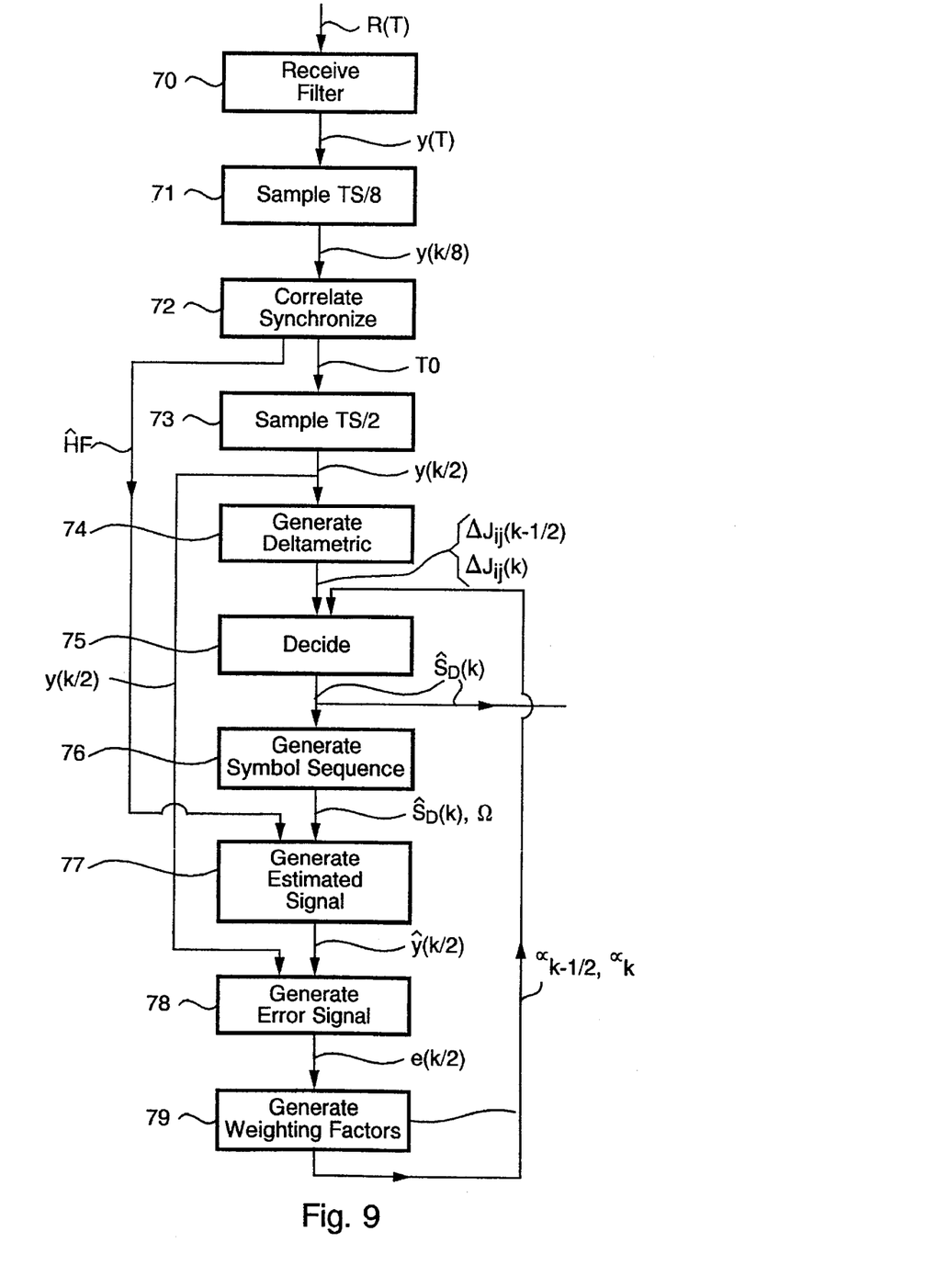
FIG. 9 is a flowsheet illustrating the inventive method.

FIG. 9 is a flowsheet which presents an overall view of the inventive method. In block 70, the radio signal R(T) is received and filtered to form a baseband signal y(T). This signal is sampled eight times with each symbol time TS according to block 71 and the sampled y(k/8) is used for channel correlation, block 72. The channel correlation produces the sampled impulse response of the radio channel 13, this response being used to determine the channel estimate HF and also to determine the symbol time point TO. The sampled signal y(k/8) according to block 73 is down sampled on the basis of this time point TO to the observed signal y(k/2), which has two signal values for each symbol time TS. One delta-metric value for each observed signal value for each state transition is generated in block 74 in accordance with the viterbi algorithm, in the illustrated example two delta-metric values $\Delta J_{ij}(k-\frac{1}{2})$ and $\Delta J_{ij}(k)$ are produced for each transition. The estimated symbols $\hat{S}_D(k)$ are decided in block 75, and the symbol sequence of these estimated symbols and the fictive zero-value symbols $\Omega$ are generated in block 76. The estimated signal values $\hat{y}(k/2)$ are generated in block 77 with the aid of the channel estimate $\hat{H}F$ and the said symbol sequence. The error signals $e(k/2)$ are generated in block 78 with the aid of the estimated signal values and the observed signal values $y(k/2)$. The weighting factors $\alpha(k/2)$ are generated in block 79, by quadrating, lowpass filtering and inverting the error signals. The weighting factors are used in block 74 to generate the total summed delta-metric values.

According to one simplified alternative, the values of the filter coefficients are only adjusted in the channel estimating circuit 31 once for each symbol sequence SS, with the aid of the first channel estimate $\hat{H}F$. This means that the circuit 34 with the adaptation algorithm is omitted. In this case, the symbol sequence with alternating estimated symbols $\hat{S}_D(k)$ and the fictive zero-value symbols $\Omega$, which are delivered to the channel estimation circuit 31, is used solely to generate the estimated signal $\hat{y}(k/2)$. According to this simplified alternative, however, the insertion of the fictive symbols $\Omega$ is significant to the generation of error signals $e(k/2)$, which according to equations (1) and (2) are generated with the aid of the estimated symbols $\hat{S}_D(k)$.

Figure 10:
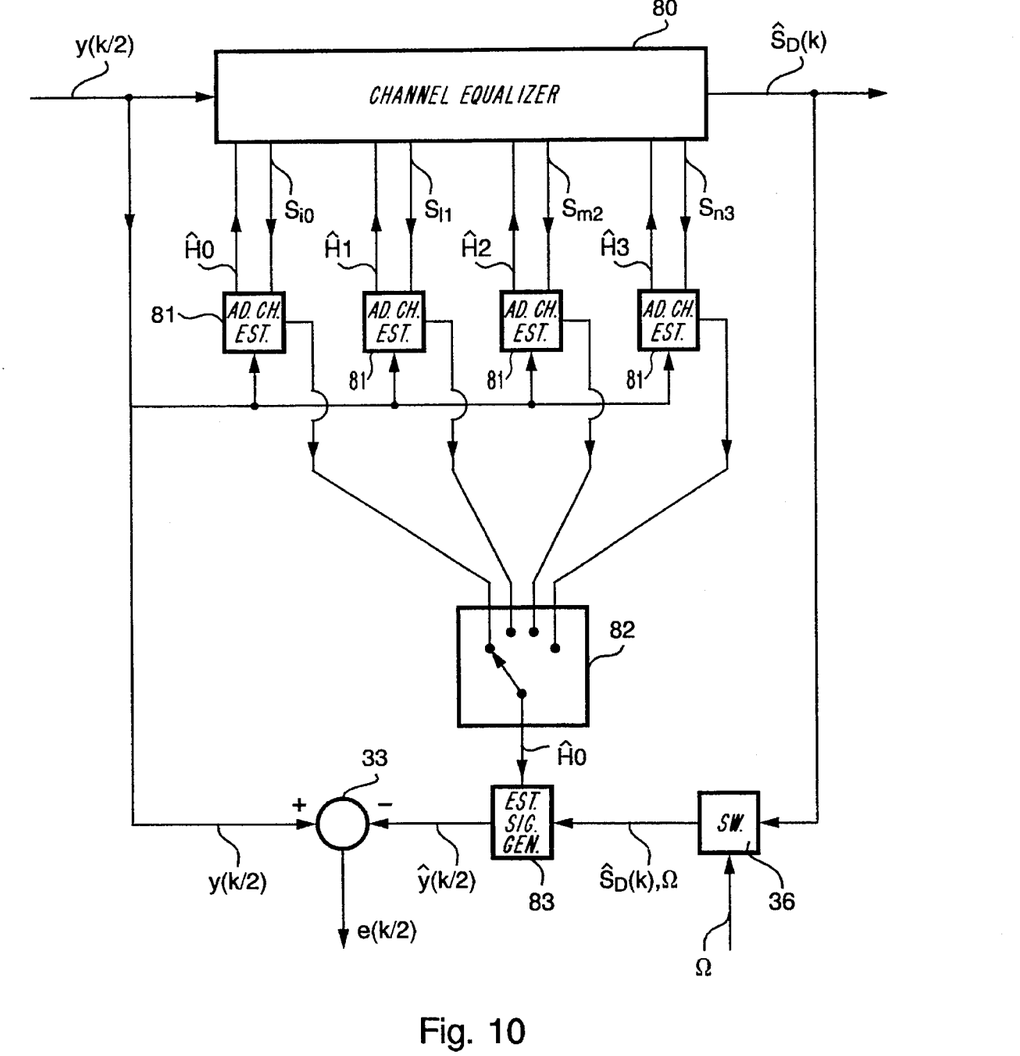
FIG. 10 is a block schematic which illustrates an alternative embodiment of the invention.

A more complicated inventive alternative will be described with reference to FIG. 10. In this alternative, there is used a channel equalizer 80 which includes an adaptive channel estimating circuit 81 for each states B of the viterbi algorithm as described for example in Swedish Patent No. 8903526-5 which corresponds to U.S. Pat. No. 5,164,961. Each of the channel estimating circuits 81 generates a respective channel estimate $\hat{H}0$, $\hat{H}1$, $\hat{H}2$ and $\hat{H}3$, which are updated with the aid of transition vectors $\hat{S}_{ij}$, in the illustrated embodiment $S_{i0}$, $S_{j1}$, $S_{m2}$ and $S_{n3}$. These vectors are used instead of the decided symbols $\hat{S}_D(k)$ in the preceding embodiment, and the channel estimates are updated in accordance with the LMS-algorithm, for instance. Each of the channel estimating circuits 81 delivers its updated channel estimate to its respective state in the viterbi algorithm. The error signal $e(k/2)$ is generated by selecting one of the channel estimates through a switch 82 which is controlled by the viterbi algorithm. In this case, there is selected the channel estimate which belongs to the state having the smallest metric value, in the illustrated example the channel estimate $\hat{H}0$, and this value is delivered to a circuit 83. The zero-value symbols $\Omega$ are inserted by the circuit 36, so as to generate the symbol sequence $\hat{S}_D(k)$, $\Omega$. The estimated signal values $\hat{y}(k/2)$ are generated in the circuit 83 with the aid of this symbol sequence. The error signal $e(k/2)$ is generated in the difference former 33, which receives the observed signal values $y(k/2)$. The weighting factors are generated in the aforedescribed manner.

In the aforedescribed exemplifying embodiment, the observed sampled signal $y(k/2)$ has two signal values for each symbol time TS. It lies within the scope of the invention to select, for instance, four or still more signal values for each symbol time. It is required, however, that the channel estimating filter 31 has correspondingly more coefficient circuits 42. According to the aforedescribed example, the channel estimate $\hat{H}(k/2)$ extends over two symbol times, although the estimate may be broader. This also requires the channel estimating filter 31 to have more coefficient circuits 42, and, above all, requires the equalizer 17 to be more complicated and to have a correspondingly larger number of states B. In order to avoid a delay when adapting the channel estimate $\hat{H}(k/2)$ and generating the weighting factors $\alpha(k/2)$, the preliminarily determined symbols $\hat{S}_P(k)$ can be used.

As before mentioned, adaptation of the channel estimating filter 31 is simplified by the insertion of the fictive zero-value symbols $\Omega$ in accordance with the invention. According to known techniques, for instance the technique according to the aforesaid article in IEEE by Yongbing Wan, et al, interpolated symbol values are used between the estimated symbol values as fictive symbols. This results in a delay when adapting the channel estimate, which always impairs the final symbol estimation. The technique defined in the article has the serious drawback that the filters in the transmission chain, transmitter and receiver filters, must be known to a high degree of accuracy. The insertion of these zero-value symbols $\Omega$ has the added advantage of avoiding a delay when generating the error signals $e(k-\frac{1}{2})$ and $e(k)$. This enables the weighting factors $\alpha_{k-\frac{1}{2}}$ and $\alpha_k$ to be generated in the absence of unnecessary delay, which improves the generation of the summed delta-metric values. This is also utilized in the aforesaid simpler embodiment which lacks adaptation of the channel estimate $\hat{H}(k/2)$. The use of the weighting factors in the generation of the total delta-metric value affords important advantages. The channel estimate $\hat{H}(k/2)$ can be short, in other words it may embrace only a few symbol times TS, and the channel estimating filter has only a few coefficient circuits. This means that a viterbi algorithm used in the symbol estimation will have a small number of states, which is extremely significant when effecting symbol estimation in practice.

We claim:

1. In a method of receiving successive digital symbols transmitted over a communication channel that uses a viterbi algorithm having a number of states, a method of estimating transmitted symbols comprising the steps of:

(a) sampling a received signal at a recurrent plurality of time points during each received symbol;

(b) correlating samples generated by step (a) with a predetermined sequence to produce at least an initial estimated impulse response of the communication channel;

(c) designating one of the plurality of time points as a symbol sampling time point based on the correlation performed in step (b);

(d) selecting at least two samples for each received symbol, the selected samples being generated at the symbol sampling point and at least one other time point;

(e) for each symbol, determining a plurality of delta-metric values according to the viterbi algorithm for each transition between states based on the selected samples and the estimated impulse response;

(f) for each symbol, weighting delta-metric values determined by step (e) and generating a combined delta-metric value for each transition between states by combining respective weighted delta-metric values determined by step (e); and (g) generating at least preliminarily estimated symbols using the combined delta-metric values generated in step (f).

2. The method of claim 1, further comprising the step of adapting the estimated impulse response by:

(a) generating estimated signal values corresponding to the symbol sampling time points and the other time points based on the estimated impulse response and the at least preliminarily estimated symbols;

(b) generating error signals as the difference between the selected samples of the received signal and the estimated signal values; and (c) successively adapting the estimated impulse response using the error signals and a selected adaptation algorithm.

3. The method of claim 2, wherein step (f) includes the step of generating respective weighting factors from the error signals and the estimated impulse response.

4. The method of claim 2, wherein step (f) includes the step of generating respective weighting factors for the delta-metric values from the error signals.

5. The method of claim 4, wherein the weighting factors are generated by squaring, averaging, and inverting the error signals.

6. The method of claim 1, wherein step (f) includes the step of generating respective weighting factors for the delta-metric values by:

(a) generating estimated signal values corresponding to the symbol sampling time points and the other time points based on the estimated impulse response and the at least preliminarily estimated symbols;

(b) generating error signals as the difference between the selected samples of the received signal and the estimated signal values; and (c) generating the weighting factors based on the error signals.

7. The method of claim 6, wherein the weighting factors are generated by squaring, low-pass filtering, and inverting the error signals.

8. The method of claim 1, wherein step (f) includes the step of generating respective weighting factors for the delta-metric values by:

(a) generating estimated signal values corresponding to the symbol sampling time points and the other time points based on the estimated impulse response and the predetermined sequence;

(b) generating error signals as the difference between the selected samples of the portion of the received signal corresponding to the sequence known to the receiver and the estimated signal values; and (c) generating the weighting factors based on the error signals.

9. The method of claim 8, wherein the weighting factors are generated by squaring, averaging, and inverting the error signals.

10. In a receiver of successive digital symbols transmitted over a communication channel that uses a viterbi algorithm having a number of states, an apparatus for estimating transmitted symbols comprising:

means for sampling a received signal at a recurrent plurality of time points during each received symbol;

means for correlating samples generated by the sampling means with a predetermined synchronizing sequence to produce at least an initial estimated impulse response of the communication channel;

means for designating one of the plurality of time points as a symbol sampling time point;

means, connected to the sampling means, for selecting at least two samples for each received symbol, the selected samples being the samples generated at the symbol sampling time point and at least one other time point; and channel equalizer means for determining, for each symbol, a plurality of delta-metric values according to the viterbi algorithm for each transition between states based on the selected samples and the estimated impulse response produced by the correlating means, for weighting the delta-metric values for the transitions between states, and for generating preliminary estimated symbols from combined delta-metric values for the transitions between states, wherein each combined delta-metric value is a combination of respective weighted delta-metric values.

11. The apparatus of claim 10, further comprising means for adapting the estimated impulse response produced by the correlating means, wherein the adapting means includes:

means for generating estimated signal values corresponding to the symbol sampling time points and the other time points based on the estimated impulse response and the preliminary estimated symbols;

means for generating error signals as the difference between the selected samples of the received signal and the estimated signal values; and means for successively adapting the estimated impulse response using the error signals and a selected adaptation algorithm.

12. The apparatus of claim 11, further comprising means for weighting the delta-metric values based on the error signals and the estimated impulse response.

13. The apparatus of claim 11, further comprising means for generating respective weighting factors for the delta-metric values from the error signals.

14. The apparatus of claim 13, wherein the weighting factor generating means includes means for squaring, averaging, and inverting the error signals.

15. The apparatus of claim 10, further comprising means for generating respective weighting factors for the delta-metric values, wherein the weighting factor generating means comprises:

means for generating estimated signal values corresponding to the symbol sampling time points and the other time points based on the estimated impulse response and the preliminary estimated symbols; and means for generating error signals as the difference between the selected samples of the received signal and the estimated signal values;

and wherein the weighting factors are generated from the error signals.

16. The apparatus of claim 15, wherein the weighting factor generating means includes means for squaring, low-pass filtering, and inverting the error signals.

17. The apparatus of claim 10, further comprising means for generating respective weighting factors for the delta-metric values, wherein the weighting factor generating means comprises:

means for generating estimated signal values corresponding to the symbol sampling time points and the other time points based on the estimated impulse response and the predetermined sequence; and means for generating error signals as the difference between the selected samples of the portion of the received signal corresponding to the predetermined sequence and the estimated signal values;

and wherein the weighting factors are generated from the error signals.

18. The apparatus of claim 17, wherein the weighting factor generating means includes means for squaring, averaging, and inverting the error signals.

19. A method of detecting digital symbols successively transmitted over a communication channel, using a viterbi algorithm having a number of states, comprising the steps of:

(a) sampling a received signal to generate a received signal sequence comprising a plurality F of samples per symbol;

(b) correlating the received signal sequence with a predetermined synchronizing sequence to produce an estimated impulse response of the communication channel, the estimated impulse response having F taps per symbol;

(c) determining F delta-metric values according to the viterbi algorithm for each transition between states, each delta-metric value being associated with a respective one of the F samples per symbol of the received signal sequence;

(d) weighting the F delta-metric values determined by step (c) and combining the weighted F delta-metric values determined by step (c) into a combined delta-metric value for each state transition by forming a weighted sum of the respective delta-metric values; and (e) generating an estimated symbol sequence according to the viterbi algorithm based on the combined delta-metric values produced by step (d).

20. The method of claim 19, wherein each combined delta-metric value is formed by multiplying each respective delta-metric value by a respective weighting factor and summing each weighted delta-metric value, the weighting factors being generated by the steps of:

padding the estimated symbol sequence with F-1 zero symbols, a zero symbol being inserted between successive estimated symbols to generate a padded estimated symbol sequence having F samples per symbol;

generating an error sequence having F samples per symbol by determining a difference between the received signal sequence and a convolution of the estimated impulse response and the padded estimated symbol sequence;

squaring the error sequence to form a squared error sequence;

splitting the squared error sequence into F partial error sequences having one sample per symbol;

low-pass filtering each partial error sequence to form a respective averaged partial error signal; and transforming the F averaged partial error signal into the weighting factors.

21. The method of claim 20, wherein the weighting factors are inverses of the averaged partial error signals.

22. The method of claim 20, wherein the weighting factors are ratios of energies of each of F symbol-sampled subsets of the estimated impulse response and the respective averaged partial error signals.

23. The method of claim 20, wherein the weighting factors are ratios of a strength of the received signal and their respective averaged partial error signals.

24. The method of claim 20, further comprising the step of adapting the estimated impulse response produced by step (b) based on the received signal sequence and the error sequence.

25. The method of claim 20, wherein a respective estimated impulse response is produced for each state, and the estimated impulse response used in forming the weighting factors is the one associated with the state having a smallest metric value.

26. The method of claim 20, wherein a respective estimated impulse response and respective weighting factors are produced for each state, and the estimated impulse response and the estimated symbol sequence used in generating the weighting factors for a particular state are those associated with the preceding state producing a smallest metric value in the transition to the particular state.

\* \* \* \* \*